Figure 1:
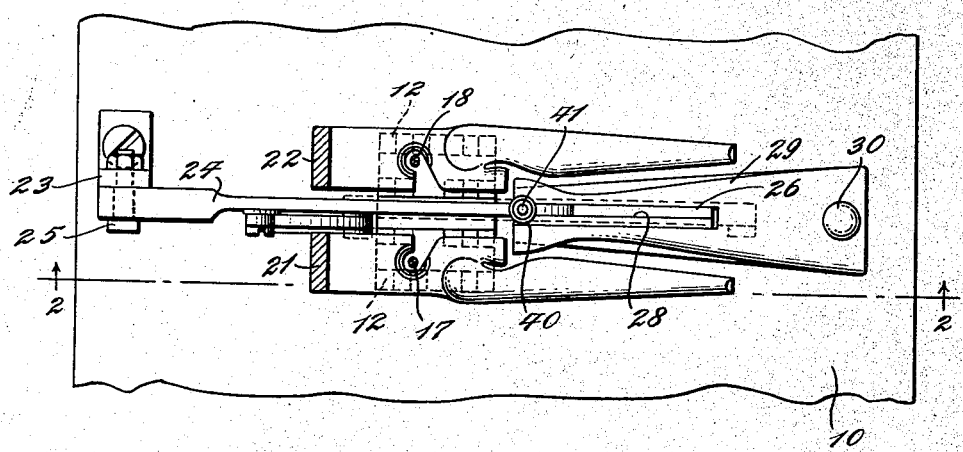

Nov. 21, 1939.   A. A. MACKENZIE   2,180,424
CUTTING AND HEMMING AND STITCHING APPARATUS
Filed May 14, 1938   2 Sheets-Sheet 1

INVENTOR
ANDREW A. MACKENZIE
BY
Lackenbach & Hirschman
ATTORNEYS

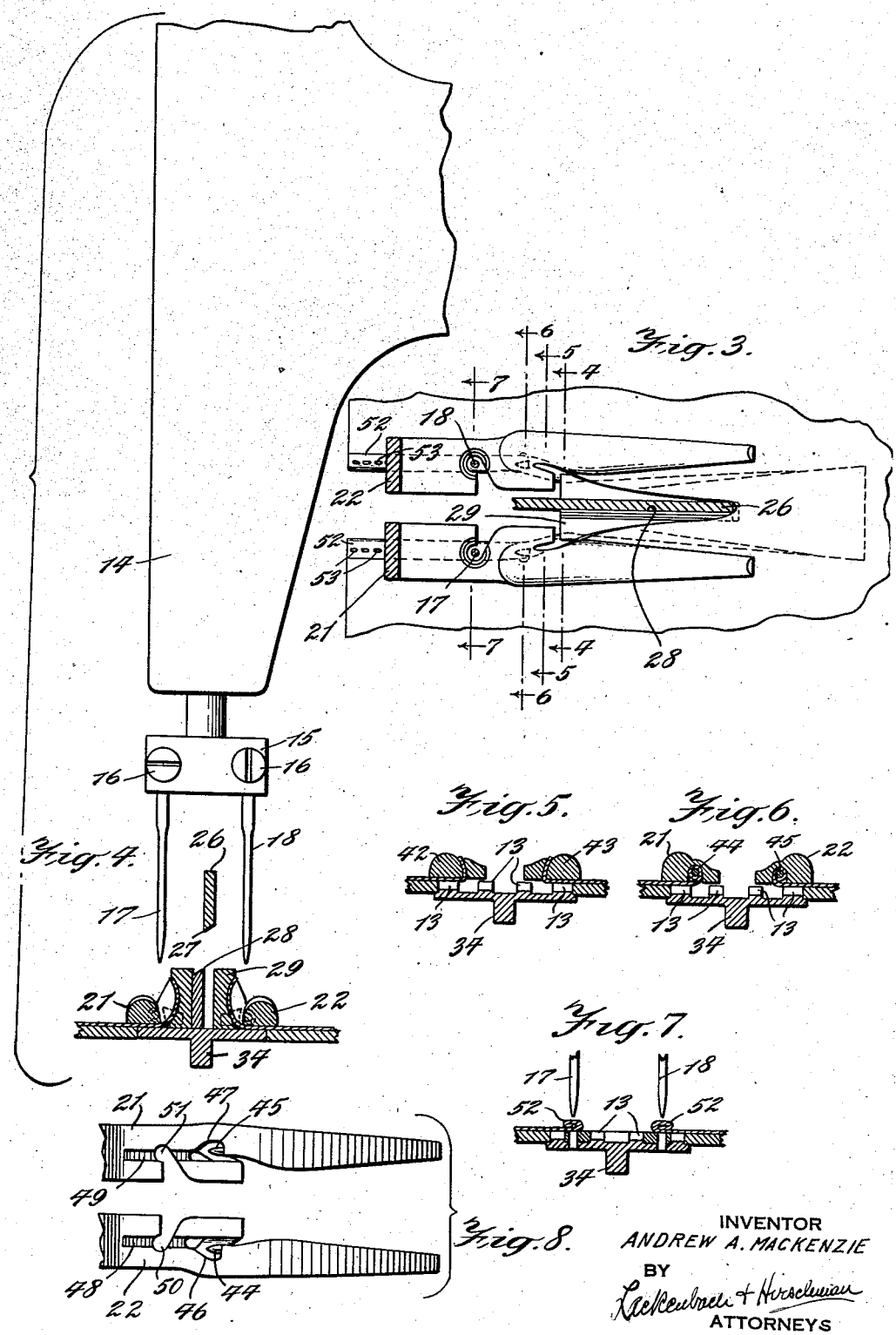

Patented Nov. 21, 1939

2,180,424

UNITED STATES PATENT OFFICE 2,180,424

CUTTING AND HEMMING AND STITCHING APPARATUS

Andrew A. Mackenzie, Passaic, N. J.

Application May 14, 1938, Serial No. 207,890

6 Claims. (Cl. 112—122)

The invention relates to an apparatus for cutting, hemming and stitching material which has previously been cut to a desired width, of any length, and the edges thereof hemmed, or which may be of any length but having selvaged edges, to constitute a completely hemmed and stitched handkerchief, scarf, napkin or the like. More particularly, the invention relates to a mechanism for effecting these operations substantially simultaneously and upon blanks severed from a bolt of goods of a length and width sufficient for a large number of such handkerchiefs, scarfs or napkins.

One of the objects of the invention is to provide a mechanism of simple construction and involving very few mechanical elements, so constructed and coordinated as to produce the desired operative results with a minimum of effort on the part of the operator, with a minimum of skill necessarily applied to the guiding of the material to and through the mechanism, and to increase, in great measure, the speed with which such handkerchiefs, scarfs or napkins may be produced upon a single machine and by a single operator.

A further object of the invention is to provide a machine of this general character which will be effective to produce handkerchiefs, scarfs or napkins in finished form with a high order of accuracy and neatness in finishing, particularly of its hemmed edges, with a machine of simple design, relatively few moving parts and substantially automatic in operation, so that no particular skill on the part of the operator is necessary for its control.

A still further object of the invention is to provide a mechanism which will insure the proper infolding of the edges of the blank of material, to form the hem usually applied to articles of this general character, and to retain such infolded edges in their proper position for stitching down such hem without appreciable variation either in the thickness of the material constituted by the hem, the width of the hem, or in the alignment of the stitching passing through the material throughout the edges of the article.

A still further object of the invention is to provide mechanism for cutting apart blanks to produce handkerchiefs, scarfs or napkins, after they have been severed from a web of material of substantial length, for instance, an entire bolt, automatically carrying such lengths of material along the edges of the proposed handkerchief, scarf, napkin or like article into the folding mechanism for effecting the infolding of the raw edges to form the hems, applying pressure to such infolded edges to produce the hem, and to stitch the hems to the edges of the material, the stitching being effected simultaneously upon both of the edges produced by the cutting instrumentality.

I am aware that in the manufacture of handkerchiefs and similar articles from a web of material, it has been suggested, and apparatus therefor has been designed, to cut handkerchief lengths or blanks from the web, fold the edges of the blanks, and then sew such folded edges to form hems. While such method and apparatus has been described as substantially automatic, and in some respects my inventive structure is similar to such method and apparatus, I have found that certain disadvantages are present in such apparatus and in the carrying out of the method by such apparatus, which has prevented the commercialization and use on any extended scale of such apparatus. The primary difficulty with such prior art structures has been that the folds of the edges of the handkerchiefs produced thereby have been too loose and no apparatus has been capable of attainment which makes it possible to start the infolding and the hemming, and therefore the stitching, of such hem until a substantial portion of the material has been fed into the mechanism. As such substantial portion may be any amount up to two inches, the difficulty has been experienced that no actual folding in a tight manner of the material to produce the hem, has been capable of accomplishment or of being sustained until the actual point, where the needle or needles are to penetrate the material, has been reached.

These and other disadvantages of the prior art structures have been due primarily to the fact that the cutting instrumentality is operated by the same carriage which supports the stitching needles, and that no proper form of hem infolding structure has been found. The structures of the prior art also necessitated the use of a large number of working parts, particularly in the connection of the cutter with the needle carriage.

In accordance with my invention and in the particular embodiment thereof selected for description and illustration, the cutting instrumentality for severing a strip of material into two parts, the raw edges of which adjacent the cutter are then to be hemmed and stitched, is operated by a mechanism entirely independent of the carriage supporting the stitching needles. Such cutter is operated, instead, directly by the feed dogs of the mechanism, or by a lever controlled by the reciprocating action of the feed dogs. In this manner, I am enabled to produce and assemble a cutter, the support for which is constituted of a single working part, rather than, as in the prior art, a plurality of elements constituted of pivoted and interconnected levers. By this construction, I am enabled to begin the hemstitching immediately at the leading edge of the cut material. Also, by means of my novel construction, I secure a tight infolding of the edges of the cut material, which tight nature of such infolded edges is maintained throughout the travel of the material during the course of its being stitched to constitute the hem, whereby the infolding of the hem is maintained in taut condition until actually penetrated by the needles carrying the thread accomplishing the hemstitching.

Figure 2:
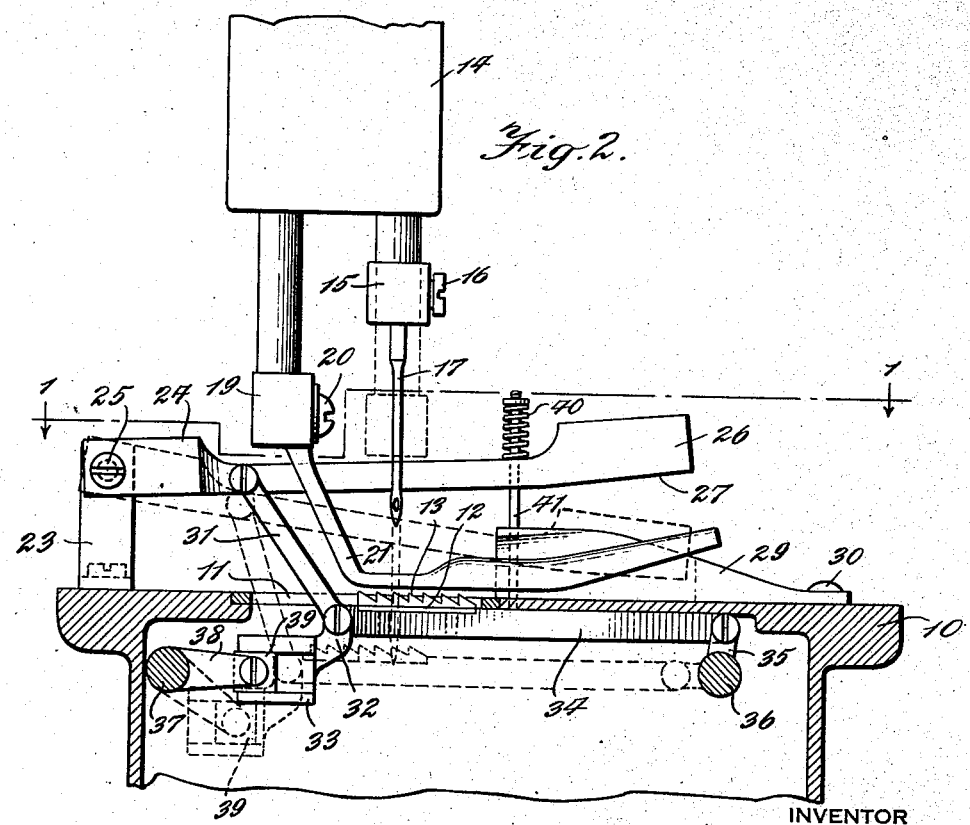

Other advantages and novel features of my improved apparatus will be evident to those skilled in the art from the following description of a particular embodiment of my novel structure, which is illustrated in the accompanying drawings. In such drawings, Fig. 1 is a plan view of the essential elements constituting my novel mechanism, with the exception of the needle carriage, the figure being thus a section on the line 1—1 of Fig. 2; Fig. 2 is a section on the line 2—2 of Fig. 1; Fig. 3 is a horizontal section through my novel mechanism, and more particularly through the cutting instrumentality in its operative position; Fig. 4 is a section on the line 4—4 of Fig. 3; Fig. 5 is a section on the line 5—5 of Fig. 3; Fig. 6 is a section on the line 6—6 of Fig. 3; Fig. 7 is a section on the line 7—7 of Fig. 3; and Fig. 8 is a bottom view of the presser feet showing the novel configuration of the hem infolding elements thereof.

Referring more particularly to the drawings, in which similar reference characters identify similar parts in the several views, 10 is the supporting surface, for instance, the table structure of a sewing machine, in a depressed channel 11 of which, are slidably mounted plates 12 constituting the conventional feeding devices or feed dogs employed in sewing machines and which have serrations in the nature of tooth-like surfaces 13, which are effective to draw material positioned thereon, through the machine.

Needle carriage 14 has depending therefrom a block 15 in which are secured by set screws 16, a pair of needles 17 and 18. Rearwardly of the block 15 and also depending from the needle carriage 14 are blocks 19, to each of which is secured by set screws 20 presser feet 21 and 22, which may take the conventional general outline, i. e., each having an aperture through which the corresponding needle may pass, but which, as to their specific novel structure, will be described in detail hereinafter.

Mounted upon a bracket 23 extending upwardly from the table surface 10 to the rear of the stitching station, is the cutting instrumentality 24 which is pivoted on the bracket 23 at 25. Such cutting instrumentality, shown in its upper, inoperative position, in full lines in Fig. 2 and in its cutting position in dotted lines in such figure, has a forward portion 26, the lower surface of which constitutes a blade 27, adapted to cooperate with a shearing edge 28 (see Fig. 4), such shearing edge being positioned centrally in the slotted guide 29 secured by bolt 30 to the table surface, and hereinafter described in greater detail.

The cutting instrumentality 24, near its pivot 25, is connected to a depending lever 31, the other end of which is secured to a projection 32 of a block slide 33 and also to one end of the feed dog supporting member 34. Such supporting member 34 has its other end connected to a link 35 reciprocating between its vertical and horizontal positions shown in Fig. 2, by the rotation of shaft 36. Shaft 37, to which is secured link 38, operatively connected to a block 39, slidably mounted in the aforesaid block slide 33, moves the feed dog supporting member 34 to and from the needle station in conventional manner.

Thus, by means of lever 31, and at a uniform rate of speed depending upon the operation of the sewing machine, the cutting instrumentality 24 is moved up and down, the upward movement being against the tension of the spring 40 positioned about a vertical pin 41 extending from the frame of the machine through the table surface 10.

The guide member 29, in the operation of the mechanism, is adapted to receive the web of material, the configuration of the guide member being such as to assist the material to assume a curvature conforming to the shape of such guide, with the nose of the guide member, being substantially centralized with respect to the knife edge 27, of the cutting instrumentality. As the material is fed by the operator over the guide member 29, the cutting edge 27 of the cutter 24 will sever the blank and the two leading edges of the severed piece of material will be guided under the presser feet 21 and 22 and moved forwardly by the feed dogs to the position in which such leading edges of the material will be curled upwardly and over by elements in the heel portions of the presser feet, now to be described.

Referring now to Figs. 3 to 8, of which Figs. 4 to 7, inclusive, illustrate the progression of the material over the guide member 29, and beneath and through the presser feet 21 and 22 in the course of the infolding of such material to form the hems. The edges of the material, after having been severed by the knife 27, are separated and fed automatically into the recesses immediately in advance of the heel portions of the presser feet, being curled, to the extent indicated in Fig. 4, by the arcuate sides of the guide member 29, the material curling against the sides of the portions 42 and 43, respectively, of the presser feet, as shown in Fig. 5. As the material is advanced, the free edges of the blanks come into contact with pins 44 and 45, extending rearwardly into the arcuate recesses 46 and 47, so that the material is curled about such pins, as shown clearly in Fig. 6. As the material advances to the stitching station, it is brought to a condition in which the edges of the material constituting the hem are substantially flat (see Fig. 7), the hems being accommodated in slots 48 and 49. The needles 17 and 18 are then passed through the flattened hem, apertures 50 and 51 in the presser feet, accommodating such needles. After passage through the stitching station, the hemstitched fabric material moves rearwardly of the machine, having had applied thereto the hem 52 sewn by stitching 53.

The general construction and operation of the apparatus may thus be summed up as follows:

The mechanism above described is attached to the presser bar of any standard sewing machine, taking the place of the regular presser feet. Between the presser feet is centered a knife blade operating off the feed bar. The operator lays the cloth on the rest or guide member in front of the knife and pushes the cloth forward under the presser feet. The knife automatically cuts the cloth in half and the two severed pieces continue on through the presser feet, being curled by the curling means embodied therein, and are passed under the needles which stitch the hem folds together. The cloth, once it acquires contact with the feed dogs of the sewing machine, which lie directly below, extending forward and aft of, the needles, is automatically carried through the mechanism for its entire length. At the expiration of the length of cloth, the operation is continued anew.

I claim:

1. In an apparatus of the type described, a support, a pair of feed dogs, a guide member for a strip of fabric material positioned on said support, in advance of said feed dogs, a vertically reciprocable cutter operable by the movement of said feed dogs, a pair of reciprocably mounted needles, one on each side of said cutter, and a pair of presser feet having means for engaging and guiding the severed edges of the material to form said edges progressively into a tight, closed, and flat condition, in which condition said edges are adapted to be penetrated by the reciprocating needles carrying threads, whereby said edges of the fabric material are hemmed and stitched.

2. In an apparatus of the type described, a support, a pair of feed dogs, a slotted guide member for a strip of fabric material positioned on said support, in advance of said feed dogs, a vertically reciprocable cutter operable by the movement of said feed dogs, the cutter being positioned to enter the slot in the forward portion of said guide member to sever the material supported by said guide member, a pair of reciprocably mounted needles, one on each side of said cutter, and a pair of presser feet having means for engaging and guiding the severed edges of the material to form said edges progressively into a tight, closed and flat condition, in which condition said edges are adapted to be penetrated by the reciprocating needles carrying threads, whereby said edges of the fabric material are hemmed and stitched.

3. An apparatus as claimed in claim 1, in which the cutter is operated by a bar carrying the feed dogs.

4. An apparatus as claimed in claim 1, in which the presser feet have two arcuate recesses and pins extending thereinto for causing the severed edges of the fabric to be curled progressively about said pins.

5. An apparatus as claimed in claim 2, in which the cutter is operated by a bar carrying the feed dogs.

6. An apparatus as claimed in claim 1, in which each of the presser feet has an arcuate recess and a pin extending thereinto for causing the severed edge of the fabric to be curled progressively about said pin, said presser feet each having a channel extending from said arcuate recess to, and past, the point of penetration of the presser foot by the needle.

ANDREW A. MACKENZIE.